US006406789B1

(12) United States Patent
McDaniel et al.

(10) Patent No.: US 6,406,789 B1
(45) Date of Patent: Jun. 18, 2002

(54) COMPOSITE PROPPANT, COMPOSITE FILTRATION MEDIA AND METHODS FOR MAKING AND USING SAME

(75) Inventors: Robert R. McDaniel, Houston, TX (US); Johannes A. Geraedts, Roggel (NL)

(73) Assignee: Borden Chemical, Inc., Columbus, OH (US)

(*) Notice: Subject to any disclaimer, the term of this patent is extended or adjusted under 35 U.S.C. 154(b) by 0 days.

(21) Appl. No.: 09/486,144

(22) PCT Filed: Jul. 22, 1999

(86) PCT No.: PCT/US99/16507

§ 371 (c)(1),
(2), (4) Date: May 22, 2000

(87) PCT Pub. No.: WO00/05302

PCT Pub. Date: Feb. 3, 2000

Related U.S. Application Data

(60) Provisional application No. 60/093,672, filed on Jul. 22, 1998.

(51) Int. Cl.[7] .............................. B32B 5/16; C09K 7/00
(52) U.S. Cl. ..................... 428/402; 166/295; 427/136; 427/181; 427/195; 427/197; 427/198; 427/215; 427/221; 427/222; 427/244; 427/385.5; 427/389.7; 427/393.5; 427/393.6; 427/397.7; 427/421; 427/424; 427/430.1; 427/443.2; 428/407; 428/426; 428/429; 428/447; 428/448; 428/451; 428/454; 428/524; 428/688; 428/689; 428/702; 428/704; 523/130; 523/131; 523/132; 523/139; 523/145; 523/205; 523/206
(58) Field of Search ........................ 166/295; 427/136, 427/181, 195, 197, 198, 215, 221, 222, 230, 244, 385.5, 389.7, 393.5, 393.6, 397.7, 421, 424, 430.1, 443.2; 428/402, 407, 426, 429, 447, 448, 451, 454, 524, 688, 689, 702, 704; 523/130, 131, 132, 139, 145, 205, 206

(56) References Cited

U.S. PATENT DOCUMENTS

| 3,217,801 | A | 11/1965 | Fast et al. |
|---|---|---|---|
| 3,659,651 | A | 5/1972 | Graham |
| 3,888,311 | A | 6/1975 | Cooke, Jr. |
| 4,443,347 | A | 4/1984 | Underdown et al. |
| 4,518,039 | A | 5/1985 | Graham et al. |
| 4,522,731 | A | 6/1985 | Lunghofer |
| 4,581,253 | A | 4/1986 | Evans et al. |
| 4,632,876 | A | 12/1986 | Laird et al. |
| 4,658,899 | A | 4/1987 | Fitzgibbon |
| 4,680,230 | A | 7/1987 | Gibb et al. |
| 4,694,905 | A | 9/1987 | Armbruster |
| 4,717,594 | A | 1/1988 | Graham et al. |
| 4,732,920 | A | 3/1988 | Graham et al. |
| 4,879,181 | A | 11/1989 | Fitzgibbon |
| 4,888,240 | A | 12/1989 | Graham et al. |
| 4,894,285 | A | 1/1990 | Fitzgibbob |

(List continued on next page.)

FOREIGN PATENT DOCUMENTS

| EP | 0308257 | 3/1989 |
|---|---|---|
| EP | 0735234 | 10/1996 |
| WO | 9927229 | 6/1999 |

OTHER PUBLICATIONS

Rickards, Allen et al, Society of Petroleum Engineers, "Need Stress Relief? A New Approach to Reducing Stress Cycling Induced Proppant Pack Failure" (No date avail.).

Primary Examiner—Bernard Pianalto
(74) Attorney, Agent, or Firm—Stevens, Davis, Miller & Mosher, LLP

(57) ABSTRACT

Composite particles made of a resin and filler material are provided for use in subterranean formations. The filler is finely divided mineral and optional fiber. The particles are proppants useful to prop open subterranean formation fractures. The particles are also useful for water filtration. Methods of making the composite particles are also disclosed.

54 Claims, 2 Drawing Sheets

U.S. PATENT DOCUMENTS

| | | |
|---|---|---|
| 4,921,820 A | 5/1990 | Rumpf et al. |
| 4,921,821 A | 5/1990 | Rumpf et al. |
| 4,977,116 A | 12/1990 | Rumpf et al. |
| 5,030,603 A | 7/1991 | Rumpf et al. |
| 5,120,455 A | 6/1992 | Lunghofer |
| RE34,371 E | 9/1993 | Rumpf et al. |
| 5,330,005 A | 7/1994 | Card et al. |
| 5,422,183 A | 6/1995 | Sinclair et al. |
| 5,439,055 A | 8/1995 | Card et al. |
| 5,501,275 A | 3/1996 | Card et al. |
| 5,531,274 A | 7/1996 | Bievenu, Jr. |
| 5,597,784 A | 1/1997 | Sinclair et al. |
| 5,639,806 A | 6/1997 | Johnson et al. |
| 5,651,816 A | 7/1997 | Kobayashi et al. |
| 6,059,034 A | 5/2000 | Rickards et al. |

COMPOSITE PROPPANT, COMPOSITE FILTRATION MEDIA AND METHODS FOR MAKING AND USING SAME

This is the National Phase under 35 USC 371 of Patent Cooperation Treaty application PCT/US99/16507, filed Jul. 22, 1999, which claims priority under 35 USC 119 from U.S. Provisional Pat. application 60/093,672, filed Jul. 22, 1998, now abandoned.

BACKGROUND OF THE INVENTION

1. Field of the Invention

The present invention relates to composite media to be used in filtration and composite proppant to be used in petroleum and gas production to "support/prop" a hydraulic fracture in the vicinity of a wellbore. The proppant keeps the hydraulic fracture open for the inflow of petroleum and/or natural gas, and can substantially improve the yield per well. More particularly, the invention relates to a composite proppants, and composite filtration media, built from suitable fillers bonded together with organic and/or inorganic tri-dimensional crosslinkers/binders. The invention also relates to methods for making and using these filtration media and proppants.

2. Description of Background Art

In general, proppants are extremely useful to keep open fractures imposed by hydraulic fracturing upon a subterranean formation, e.g., an oil or gas bearing strata. Typically, the fracturing is desired in the subterranean formation to increase oil or gas production. Fracturing is caused by injecting a viscous fracturing fluid or a foam at high pressure into the well to form fractures. As the fracture is formed, a particulate material, referred to as a "propping agent" or "proppant" is placed in the formation to maintain the fracture in a propped condition when the injection pressure is released. As the fracture forms, the proppants are carried into the well by suspending them in additional fluid or foam to fill the fracture with a slurry of proppant in the fluid or foam. Upon release of the pressure, the proppants form a pack which serves to hold open the fractures. The goal of using proppants is to increase production of oil and/or gas by providing a highly conductive channel in the formation. Choosing a proppant is critical to the success of well stimulation.

The propped fracture thus provides a highly conductive channel in the formation. The degree of stimulation afforded by the hydraulic fracture treatment is largely dependent upon formation parameters, the fracture's permeability and the fracture's propped width. If the proppant is an uncoated substrate, e.g., sand, and is subjected to high stresses existing in a gas/oil well, the substrate may be crushed to produce fines of crushed proppant. Fines will subsequently reduce conductivity within the proppant pack. However, a resin coating will enhance crush resistance of a coated particle above that of the substrate alone.

Glass beads had been used as propping materials (see U.S. Pat. No. 4,068,718, incorporated herein by reference for the state of the technology). Their disadvantages include the costs of energy and production, as before, and their severe drop in permeability at elevated pressures (above about 35 MPa) because of their excessive crushing at downhole conditions. Thus, it is not currently favored.

Three different types of propping materials, i.e., proppants, are currently employed.

The first type of proppant is a sintered ceramic granulation/particle, usually aluminum oxide, silica, or bauxite, often with clay-like binders or with incorporated hard substances such as silicon carbide (e.g., U.S. Pat. No. 4,977,116 to Rumpf et al, incorporated herein by reference, EP Patents 0 087 852, 0 102 761, or 0 207 668). The ceramic particles have the disadvantage than the sintering must be done at high temperatures, resulting in high energy costs. In addition, expensive raw materials are used. They have relatively high bulk density, and often have properties similar to those of corundum grinding materials, which cause high wear in the pumps and lines used to introduce them into the drill hole.

The second type of proppant is made up of a large group of known propping materials from natural, relatively coarse, sands, the particles of which are roughly spherical, such that they can allow significant flow (English "frac sand") (see U.S. Pat. No. 5,188,175 for the state of the technology).

The third type of proppant includes samples of type one and two that may be coated with a layer of synthetic resin (U.S. Pat. No. 5,420,174 to Deprawshad et al; U.S. Pat. No. 5,218,038 to Johnson et al and U.S. Pat. No. 5,639,806 to Johnson et al (the disclosures of U.S. Pat. Nos. 5,420,174, 5,218,038 and 5,639,806, incorporated herein by reference); EP Patent No. 0 542 397).

Known resins used in resin coated proppants include epoxy, furan, phenolic resins and combinations of these resins. The resins are from about 1 to about 8 percent by weight of the total coated particle. The particulate substrate for resin coated proppants may be sand, ceramics. or other particulate substrate and typically has a particle size in the range of USA Standard Testing screen numbers from about 8 to about 100 (i.e. screen openings of about 0.0937 inch to about 0.0059 inch).

Resin coated proppants come in two types: precured and curable. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate. Such precured resin coated proppants are typically held in the well by the stress surrounding them. In some hydraulic fracturing circumstances, the precured proppants in the well would flow back from the fracture, especially during clean up or production in oil and gas wells. Some of the proppant can be transported out of the fractured zones and into the well bore by fluids produced from the well. This transportation is known as flow back.

Flowing back of proppant from the fracture is undesirable and has been controlled to an extent in some instances by the use of a proppant coated with a curable resin which will consolidate and cure underground. Phenolic resin coated proppants have been commercially available for some time and used for this purpose. Thus, resin-coated curable proppants may be employed to "cap" the fractures to prevent such flow back. The resin coating of the curable proppants is not significantly crosslinked or cured before injection into the oil or gas well. Rather, the coating is designed to crosslink under the stress and temperature conditions existing in the well formation. This causes the proppant particles to bond together forming a 3-dimensional matrix and preventing proppant flow back.

These curable phenolic resin coated proppants work best in environments where temperatures are sufficiently high to consolidate and cure the phenolic resins. However, conditions of geological formations vary greatly. In some gas/oil wells, high temperature (>180° F.) and high pressure (>6, 000 psi) are present downhole. Under these conditions, most curable proppants can be effectively cured. Moreover, proppants used in these wells need to be thermally and physically stable, i.e., do not crush appreciably at these temperatures and pressures.

Curable resins include (I) resins which are cured entirely in the subterranean formation and (ii) resins which are partially cured prior to injection into the subterranean formation with the remainder of curing occurring in the subterranean formation.

Many shallow wells often have downhole temperatures less than 130° F., or even less than 100° F. Conventional curable proppants will not cure properly at these temperatures. Sometimes, an activator can be used to facilitate curing at low temperatures. Another method is to catalyze proppant curing at low temperatures using an acid catalyst in an overflush technique. Systems of this type of curable proppant have been disclosed in U.S. Pat. No. 4,785,884 to Armbruster and the disclosure of this patent is incorporated by reference in its entirety. In the overflush method, after the curable proppant is placed in the fracture, an acidic catalyst system is pumped through the proppant pack and initiates the curing even at temperatures as low as about 70° F. This causes the bonding of proppant particles.

Due to the diverse variations in geological characteristics of different oil and gas wells, no single proppant possesses all properties which can satisfy all operating requirements under various conditions. The choice of whether to use a precured or curable proppant or both is a matter of experience and knowledge as would be known to one skilled in the art.

In use, the proppant is suspended in the fracturing fluid. Thus, interactions of the proppant and the fluid will greatly affect the stability of the fluid in which the proppant is suspended. The fluid needs to remain viscous and capable of carrying the proppant to the fracture and depositing the proppant at the proper locations for use. However, if the fluid prematurely loses its capacity to carry, the proppant may be deposited at inappropriate locations in the fracture or the well bore. This may require extensive well bore cleanup and removal of the mispositioned proppant.

It is also important that the fluid breaks (undergoes a reduction in viscosity) at the appropriate time after the proper placement of the proppant. After the proppant is placed in the fracture, the fluid shall become less viscous due to the action of breakers (viscosity reducing agents) present in the fluid. This permits the loose and curable proppant particles to come together, allowing intimate contact of the particles to result in a solid proppant pack after curing. Failure to have such contact will give a much weaker proppant pack.

Foam, rather than viscous fluid, may be employed to carry the proppant to the fracture and deposit the proppant at the proper locations for use. The foam is a stable foam that can suspend the proppant until it is placed into the fracture, at which time the foam breaks. Agents other than foam or viscous fluid may be employed to carry proppant into a fracture where appropriate.

Also, resin coated particulate material, e.g., sands, may be used in a wellbore for "sand control." In this use, a cylindrical structure is filled with the proppants, e.g., resin coated particulate material, and inserted into the wellbore to act as a filter or screen to control or eliminate backwards flow of sand, other proppants, or subterranean formation particles. Typically, the cylindrical structure is an annular structure having inner and outer walls made of mesh. The screen opening size of the mesh being sufficient to contain the resin coated particulate material within the cylindrical structure and let fluids in the formation pass therethrough.

While useful proppants are known, it would be beneficial to provide proppants having improved features such as good flow back, good compressive strength, as well as good long term conductivity, i.e., permeability, at the high closure stresses present in the subterranean formation. Flow back, as discussed above, relates to keeping the proppant in the subterranean formation. Compressive strength relates to permitting the proppant to withstand the forces within the subterranean formation. High conductivity directly impacts the future production rate of the well. It would be especially beneficial to provide such proppants from raw materials which can be obtained and processed at relatively low and moderate cost, as well as a process for producing them, such that the formed particle will produce less wear in the equipment used to introduce it into the drill hole because of its low bulk density and its smooth surface.

A separate area of proposed use is in water filtration. In many industrial and non industrial situations there is a need to be able to extract solids from a stream of water. There is a wide range of filtration systems designed to meet these requirements. Most of these systems use a solid particulate to form a filtration pack through which the water containing the solid flows. The particulate (filtration media) retains the solid within the pore space of the pack and allows the water to pass through (with a lower solids content). Periodically, the filter must be back flushed to remove the trapped solids so that the filtration process can continue. A filtration media should have the following traits:

- a high particle surface area so that there are many opportunities to trap the solids.
- the lowest possible density so that the number of pounds required to fill the filter and the flow rate required to back flush (a process that expands the volume of the filter pack) are both minimized.
- be acid/base/solvent resistant so that the media's integrity is unaffected by the presence of these materials.
- be non toxic in nature so that undesirable chemicals are not leached into the water stream being filtered.
- have the ability to be made in various sizes (20/40, 16/30, etc.) and densities so that filter packs can be designed to extract a variety of particles.

Examples of currently used filtration media are sand, ceramics, activated charcoal and walnut hulls.

OBJECTS OF THE INVENTION

It is an object of the present invention to provide proppants comprising a filler, of finely divided minerals or finely divided mineral and fibers, bound by a binder.

It is another object of the present invention to provide filtration media for extracting solids from a water stream comprising a filler, of finely divided minerals or finely divided minerals and fibers, bound with polymer.

It is another object of the present invention to provide methods of making proppant, or filtration media, comprising a filler, of finely divided minerals or finely divided minerals and fibers, bound with polymer.

It is another object of the present invention to provide methods of using proppant or filtration media, comprising a filler, of finely divided minerals or finely divided minerals and fibers, bound with polymer.

These and other objects of the present invention will become apparent from the following specification.

BRIEF DESCRIPTION OF THE DRAWINGS

The following briefly describes the drawings of the present specification, wherein like elements are identified by like numbers.

SUMMARY OF THE INVENTION

Figure 1:
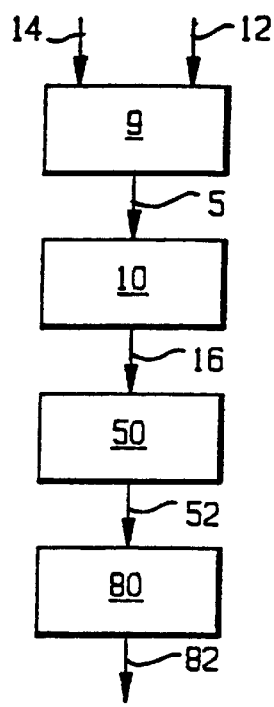
FIG. 1 shows a process flow diagram of a first embodiment of a process for making particles of the present invention.

The invention provides a composite particle for proppant or filtration media comprising filler particles, e.g., finely divided mineral or finely divided mineral and fiber, bound by a suitable organic or inorganic binder. A typical organic binder is a phenolic resole resin or phenolic novolac resin. Typical inorganic binders include silicates, e.g., sodium silicate, phosphates, e.g., polyphosphate glass, borates, or mixtures thereof, e.g., silicate and phosphate.

The filler particles may be any of various kinds of commercially available finely divided minerals or finely divided minerals and short fibers. The finely divided minerals include at least one member of the group consisting of silica (quartz sand), alumina, mica, meta-silicate, calcium silicate, calcine, kaoline, talc, zirconia, boron and glass. Such fibers include at least one member selected from the group consisting of milled glass fibers, milled ceramic fibers, milled carbon fibers and synthetic fibers, having a softening point above about 200° F. so as to not degrade, soften or agglomerate during production or use.

The present composite particles are substantially spherical. The composite particles have a sphericity of at least 0.7, preferably at least 0.85, and most preferably at least 0.90, as measured according to API Method RP56 Section 5.

The composite particles are made by mixing filler particles selected from at least one member of the group consisting of finely divided mineral and possibly the appropriate short fiber with at least one binder. In particular, the composite particles are made by mixing the filler particles with a first portion of binder to form substantially homogeneous core particles of granulated product comprising the filler particles and the first portion of binder. By "substantially homogeneous" it is meant that the core particle has an absence of a large substrate particle as common, for example, for coated sand proppants. To strengthen the composite particles, a second portion of binder may be coated onto the core particles of granulated product. The core binders are preferably precured. The outer coating resins are curable or precured.

For purposes of this application, the term "cured" and "crosslinked" are used interchangeably for the hardening which occurs in an organic binder. However, the term "cured" also has a broader meaning in that it generally encompasses the hardening of any binder, organic or inorganic, to form a stable material. For example, crosslinking, ionic bonding and/or removal of solvent to form a bonded material in its final hardened form may be considered curing. Thus, mere removal of solvent from an organic binder prior to crosslinking may or may not be curing depending upon whether the dry organic binder is in filial hardened form.

Optionally, the uncoated composite particles or coated proppant particles are dried, but not cured (e.g., crosslinked), and then undergo a mechanical refining of the surface to smooth it to make it a substantially spherical shape.

The composite particles, as described in this invention have special and unique properties such as controlled plasticity and elasticity behavior. Because of these unique properties, the composite particles can be applied as the sole proppant in a 100% proppant pack (in the hydraulic fracture) or as a part replacement of existing commercial available ceramic and/or sand-based proppants, resin-coated and/or uncoated, or as blends between those. The composite particles can also be employed as the sole media in a 100% filtration pack or blended with other filtration media.

As applied, the composite particles used as proppants improve flow-back control of the pack, and decrease the forming and generation of fines when used to fill 100% of the fracture or used in a combination pack with other commercially available proppants. As applied, the composite particles also greatly reduce the detrimental effects of embedment and subsequent fines generation (that are the result of the embedment process) that is commonly associated with the use of other commercially available proppants. The reduction in embedment can be attributed to the elastic nature of the composite and its ability to better distribute the downhole stresses. Combining all of these properties of the composite particle will lead to increase in the conductivity/permeability of the pack.

Selecting the below-specified volume proportions of finely divided minerals and synthetic binder give surprisingly good flexural resistance strength, which is also a measure of a steelball-pointed strength and hardness (Brinell Strength). This is a very important factor for the use of the present materials as proppants. The flexural strengths are generally somewhat higher when quartz sand is used as the mineral than with aluminum oxide.

The proppant according to the invention has higher resistance to compressive forces than some ceramic proppants, and therefore has less grain failure. This reduces point stresses and generates less fines (which can damage fracture conductivity) than previous experience would lead one to expect just from the absolute values of the breaking strength. The preferred sphericity $\phi$ is greater than 0.9, specifically due to the use of appropriate post-processing measures.

The invention also provides improved methods of using the above-described particles as media for water filtration or as curable and/or precured proppants for treating subterranean formations.

DETAILED DESCRIPTION OF THE PREFERRED EMBODIMENTS

The filler particles of the present invention may be employed with any conventional proppant resin. The type of resin and filler making up the proppant will depend upon a number of factors including the probable closure stress, formation temperature, and the type of formation fluid.

The term resin includes a broad class of high polymeric synthetic substances. Resin includes thermosetting and thermoplastic materials. Specific thermosets include epoxy, phenolic, e.g., resole (a true thermosetting resin) or novolac (thermoplastic resin which is rendered thermosetting by a hardening agent), polyester resin, and epoxy-modified novolac as disclosed by U.S. Pat. No. 4,923,714 to Gibb et al incorporated herein by reference. The phenolic resin comprises any of a phenolic novolac polymer; a phenolic resole polymer; a combination of a phenolic novolac polymer and a phenolic resole polymer; a cured combination of phenolic/furan resin or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties. Resole resins are preferred. Specific thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Another typical resin is latex.

1. Finely Divided Minerals

The finely divided minerals include at least one member of the group consisting of silica (quartz sand), alumina, mica, meta-silicate, calcium silicate, calcine, kaoline, talc, zireonia, boron and glass. Microcrystalline silica is especially preferred.

The particles of finely divided minerals range in size from about 2 to about 60 $\mu$m. Typically, the particles of minerals have a $d_{50}$ of about 4 to about 45 $\mu$m, preferably about 4 to about 6 $\mu$m. The parameter $d_{50}$ is defined as the diameter for which 50% of the weight of particles have the specified particle diameter. Preferred filler wold be rounded in shape rather than angular or subangular to minimize sharp edges in the matrix of the formed particle. One example of such preferred material is IMSIL microcrystalline silica, available from Unimim Specialty Minerals, Elco, Ill.

IMSIL microcrystalline silica fillers are produced from an inert, naturally occurring alpha quartz with a grape-like morphology. This filler may be wetted and dispersed in either solvent or water-based systems. Table A lists this filler's properties.

TABLE A

PARTICLE SIZE ANALYSIS AND PROPERTIES

|  | Micron | A-75 | 1240 | A-30 | A-25 | A-15 | A-10 | A-8 |
|---|---|---|---|---|---|---|---|---|
| Typical Mean % | 300 | — | — | — | — | — | — | — |
| Passing on Individual | 212 | 100.0 | — | — | — | — | — | — |
| Sieves | 160 | 99.89 | — | — | — | — | — | — |
|  | 106 | 99.39 | 100.0 | 100.0 | — | — | — | — |
|  | 75 | 97.79 | 99.98 | 99.99 | — | — | — | — |
|  | 55 | 96.15 | 99.70 | 99.78 | — | — | — | — |
|  | 45 | 95.00 | 98.60 | 99.60 | 100.0 | — | — | — |
|  | 40 | — | — | — | 99.9 | — | — | — |
|  | 20 | — | — | — | 96.0 | 100.0 | — | — |
|  | 15 | — | — | — | 90.0 | 98.5 | 100.0 | 100.0 |
|  | 10 | — | — | — | 77.0 | 92.0 | 98.5 | 99.3 |
|  | 5 | — | — | — | 51.0 | 65.2 | 76.0 | 87.0 |
| Median Particle Size ($\mu$) |  | 12.0 | 8.7 | 8.2 | 6.5 | 3.9 | 2.4 | 2.1 |
| Surface Area (m$^2$/g) |  | 1.3 | 0.9 | 1.1 | 1.0 | 1.3 | 1.6 | 2.0 |
| Brightness (TAPPI) |  | 82.0 | 84.1 | 84.1 | 84.7 | 85.2 | 85.8 | 86.4 |
| Oil Absorption (g/100 g) |  | 27 | 28 | 28 | 28 | 29 | 28 | 28 |
| Moisture (%) |  | 0.17 | 0.17 | 0.17 | 0.18 | 0.20 | 0.20 | 0.20 |
| Weight/Solid Gallon |  | 22.07 lbs/gallon | | | ASTM D-153 | | | |
| Bulking Value |  | 0.0453 | | | ASTM C-29 | | | |
| Specific Gravity |  | 2.65 g/cm$^3$ | | | ASTM C-128 | | | |
| pH |  | 6.6 | | | AFS 113-87-S | | | |
| Refractive Index |  | 1.54–1.55 | | | ASTM D-801 | | | |
| Hardness |  | 6.5 Mohs | | | Moh Scale | | | |

A. Filler Particles

The filler particles should be inert to components in the subterranean formation, e.g., well treatment fluids, and be able to withstand the conditions, e.g., temperature and pressure, in the well. Filler particles, e.g., finely divided minerals or combinations of finely divided minerals and fibers, of different dimensions and/or materials may be employed together. The filler particle is preferably monocrystalline in nature, to be more abrasion resistant, and thus enhance the ability of the composite particle to withstand pneumatic conveying. It is important that the dimensions and amount of filler particles, as well as the type and amount of resin, be selected so that the filler particles remain within the resin of the proppant rather than being loosely mixed with proppant particles. The containment of filler particles prevents loose particles from clogging parts, e.g., screens, of an oil or gas well. Moreover, the attachment prevents loose particles from decreasing permeability in the oil or gas well.

Fly ash, with a typical $SiO_2$ content between 40 and 60% by weight and typical $Al_2O_3$ center between 20 and 40% by weight, can also be used as the mineral to save materials costs for certain requirements. The typical grain size of this material ($d_{50}$) is up to 35 $\mu$m, so that grinding down to the preferred value of 4 to 6 $\mu$m might still be conducted. The fly ash should have a minimal amount of carbon, whose presence would weaken the proppant particle.

2. Fibers

The fibers may be any of various kinds of commercially available short fibers. Such fibers include at least one member selected from the group consisting of milled glass fibers. milled ceramic fibers, natural fibers, and synthetic fibers, e.g., crosslinked novolac fibers, having a softening point above typical starting temperature for blending with resin, e.g., at least about 200° F.,so as to not degrade, soften or agglomerate.

The typical glasses for fibers include E-glass, S-glass, and AR-glass. E-glass is a commercially available grade of glass fibers typically employed in electrical uses. S-glass is used for its strength. AR-glass is used for its alkali resistance. The carbon fibers are of graphitized carbon. The ceramic fibers are typically alumina, porcelain, or other vitreous material.

Fiber lengths range from about 6 microns to about 3200 microns (about ⅛ inch). Preferred fiber lengths range from about 10 microns to about 1600 microns. More preferred fiber lengths range from about 10 microns to about 800 microns. A typical fiber length range is about 0.001 to about 1/16 inch. Preferably, the fibers are shorter than the greatest length of the substrate. Suitable, commercially available fibers include milled glass fiber having lengths of 0.1 to about 1/32 inch; milled ceramic fibers 25 microns long; milled carbon fibers 250 to 350 microns long, and KEVLAR aramid fibers 12 microns long. Fiber diameter (or, for fibers of non-circular cross-section, a hypothetical dimension equal to the diameter of a hypothetical circle having an area equal to the cross-sectional area of the fiber) range from about 1 to about 20 microns. Length to aspect ratio (length to diameter ratio) may range from about 5 to about 175. The fiber may have a round, oval, square, rectangular or other appropriate cross-section. One source of the fibers of rectangular cross-section may be chopped sheet material. Such chopped sheet material would have a length and a rectangular cross-section. The rectangular cross-section has a pair of shorter sides and a pair of relatively longer sides. The ratio of lengths of the shorter side to the longer side is typically about 1:2–10. The fibers may be straight, crimped, curled or combinations thereof.

B. Resins

1. Resole Resins

The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. The resoles may be conventional resoles or modified resoles. Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Metal ion catalysts useful in production of the modified phenolic resole resins include salts of the divalent ions of Mn, Zn, Cd, Mg, Co, Ni, Fe, Pb, Ca and Ba. Tetra alkoxy titanium compounds of the formula Ti(OR)$_4$ where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-benzylic ether bridges of the general formula —CH$_2$(OCH$_2$)$_n$— where n is a small positive integer.

2. Phenol-Aldehyde Novolac Polymer-Containing Resins

An embodiment of the present invention employs resin which includes phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para toluenesulfonic acid. An alternative way to make novolacs is to react a phenol and an aldehyde in the presence of divalent inorganic salts such as zinc acetate, zinc borate, maganese salts, cobalt salts, etc. The selection of catalyst may be important for directing the production of novolacs which have various ratios of ortho or para substitution by aldehyde on the phenolic ring, e.g., zinc acetate favors ortho substitution. Novolacs enriched in ortho substitution, i.e., high-ortho novolacs, may be preferred because of greater reactivity in further cross-linking for polymer development. High ortho novolacs are discussed by Knop and Pilato, *Phenolic Resins*, p. 50–51 (1985) (Springer-Verlag) incorporated herein by reference. High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

The novolacs used in this invention are generally solids such as in the form of a flake, powder, etc. The molecular weight of the novolac will vary from about 500 to 10,000, preferably 1,000 to 5,000 depending on their intended use. The molecular weight of the novolacs in this description of the present invention are on a weight average molecular weight basis. High-ortho novolac resins are especially preferred.

The resin composition typically comprises at least 10 weight percent novolac polymer, preferably at least about 20 weight percent novolac polymer, most preferably about 50 to about 70 weight percent novolac polymer. The remainder of the resin composition could include crosslinking agents, modifiers or other appropriate ingredients.

The phenolic moiety of the novolac polymer is selected from phenols of Formula I or bisphenols of Formula II, respectively:

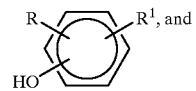

I

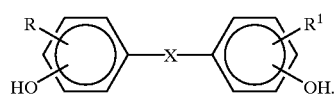

II

R and R$^1$ are independently alkyl, aryl, arylalkyl or H. In Formula II, R and R$^1$ are preferably meta to the respective hydroxy group on the respective aromatic ring. Unless otherwise defined, alkyl is defined as having 1 to 6 carbon atoms, and aryl is defined as having 6 carbon atoms in its ring. In Formula II, X is a direct bond, sulfonyl, alkylidene unsubstituted or substituted with halogen, cycloalkylidene, or halogenated cycloalkylidene. Alkylidene is a divalent organic radical of Formula III:

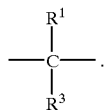

When X is alkylidene, $R^2$ and $R^3$ are selected independently from H, alkyl, aryl, arylalkyl, halogenated alkyl, halogenated aryl and halogenated arylalkyl. When X is halogenated alkylidene, one or more of the hydrogen atoms of the alkylidene moiety of Formula II are replaced by a halogen atom. Preferably the halogen is fluorine or chlorine. Also, halogenated cycloalkylidene is preferably substituted by fluorine or chlorine on the cycloalkylidene moiety.

A typical phenol of Formula I is phenol, per se.

Typical bisphenols of Formula II include Bisphenol A, Bisphenol C, Bisphenol E, Bisphenol F, Bisphenol S, or Bisphenol Z.

The present invention includes novolac polymers which contain any one of the phenols of Formula I, bisphenols of Formula II, or combinations of one or more of the phenols of Formula I and/or one or more of the bisphenols of Formula II. The novolac polymer may optionally be further modified by the addition of VINSOL®, epoxy resins, bisphenol, waxes, or other known resin additives. One mode of preparing an alkylphenol-modified phenol novolac polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present. Under acidic conditions, the polymerization of the methylolated phenols is a faster reaction than the initial methylolation from the formaldehyde. Consequently, a polymer structure is built up consisting of phenolic and alkylphenolic nuclei, linked together by methylene bridges, and with essentially no free methylol groups. In the case of metal ion catalysis, the polymerization will lead to methylol and benzylic ethers, which subsequently break down to methylene bridges, and the final product is essentially free of methylol groups.

C. Crosslinking Agents and Other Additives

For practical purposes, phenolic novolacs do not harden upon heating, but remain soluble and fusible unless a hardener (crosslinking agent) is present. Thus, in curing a novolac resin, a crosslinking agent is used to overcome the deficiency of alkylene-bridging groups to convert the resin to an insoluble infusible condition.

Appropriate crosslinking agents include hexamethylenetetramine (HEXA), paraformaldehyde, oxazolidines, melamine resin or other aldehyde donors and/or the above-described resole polymers. Each of these crosslinkers can be used by itself or in combinations with other crosslinkers. The resole polymer may contain substituted or unsubstituted phenol.

The resin composition of this invention typically comprises up to about 25 weight percent HEXA and/or up to about 90 weight percent resole polymers based on the total weight of coating composition. Where HEXA is the sole crosslinking agent, the HEXA comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers.

Additives are used for special cases for special requirements. The resin systems of the invention may include a wide variety of additive materials. The resin may also include one or more other additives such as a coupling agent such as a silane to promote adhesion of the coating to substrate, a silicone lubricant, a wetting agent, a surfactant, dyes, flow modifiers (such as flow control agents and flow enhancers), and/or anti-static agents. The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

D. Manufacturing of Resoles

A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation. Elasticizers or plastizers, such as bisphenol A or cashew nut oil, may also be present to enhance the binder elasticity or plasticity. Other known additives may also be present.

E. Method to Make Novolac Polymer

To make phenolic novolac polymers with one or more phenols of Formula I, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolac. The molten novolac is then cooled and flaked.

To make novolac polymers with bisphenols of Formula II, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolac resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

F. Reacting Aldehyde With Phenol-Aldehyde Novolacs or Bisphenol-Aldehyde Novolacs Phenol-aldehyde novolacs or bisphenol-aldehyde novolacs may be modified by reacting these novolacs with an additional quantity of aldehyde using a basic catalyst. Typical catalysts used are sodium hydroxide, potassium hydroxide, barium hydroxide, calcium hydroxide (or lime), ammonium hydroxide and amines.

In the case of phenol-aldehyde polymers or bisphenol-aldehyde polymers, the molar ratio of added aldehyde to phenolic moiety, based on the phenolic moiety monomeric units in the novolac, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation.

These polymers can be used alone or with other polymers, such as phenol-aldehyde novolacs, bisphenol-aldehyde novolac, or combinations thereof, as a crosslinking agent, or as a component of crosslinking agents. When the aldehyde-modified polymers are employed as crosslinking agents, they may be used with other typical crosslinking agents such as those described above for novolac polymers.

G. Methods to Make Proppant or Filtration Media

After making the resin, the crosslinking agent, resin and filler particles are mixed at conditions to provide either a precured or curable resin composition, as desired. Whether a resin composition is of the precured or curable type depends upon a number of parameters. Such parameters include the ratio of the novolac resin to the curing agent; the acidity of the novolac resin; the pH of the resole resin; the amount of the crosslinking agent; the time of mixing the resin compositions and filler particles; the temperature of the resin compositions and filler particles during mixing; catalysts (if any) used during the mixing and other process parameters as known to those skilled in the art. Typically, the precured or curable proppants may contain resole resin in the presence or absence of novolac resin.

FIG. 1 shows a simplified process flow diagram of a first embodiment of a process for making proppants or filtration media of the present invention. In the process, a binder stream 12 and a filler particle stream 14 are fed to a high intensity mixer 9 to prepare a homogeneous slurry stream 5. Slurry stream 5 feeds a granulator 10 to produce a granulated product stream 16. The binder stream 12 contains resin, water and conventional additives. Typically, the resin is a resole and may act as its own crosslinking agent. Coupling agents are also typical additives. A typical granulator 10 is an Eirich R02 mixer manufactured by Eirich Machines, Inc., Gurnee. Ill.

Typically, the granulator 10 is operated as a batch process and is operated as disclosed generally in EP 308 257 and U.S. Pat. No. Re. 34,371, both of which are incorporated herein by reference. For example, EP 308 257 discloses making ceramic particles in an Eirich machine described in U.S. Pat. No. 3,690,622. The machine comprises a rotatable cylindrical container, the central axis of which is at an angle to the horizontal, one or more deflector plates, and at least one rotatable impacting impeller usually located below the apex of the path of rotation of the cylindrical container. The rotable impacting impeller engages the material being mixed and may rotate at a higher angular velocity than the rotatable cylindrical container.

The following sequence occurs in the mix pelletizer (granulator 10):(1) nucleation or seeding at which time slurry is added near the impacting impeller; (2) growth of the spheroids during which the impacting impeller rotates at slower speed than during the nucleation step; and (3) polishing or smoothing the surfaces of the spheroids by turning off the impacting impeller and allowing the cylindrical container to rotate.

The amount of binder (resin) generally comprises about 10 to about 30, preferably about 10 to about 25, weight percent of the total dry materials (resin, filler, etc.) fed to the granulator 10. The amount of binder being a water free value defined as the amount of resin, e.g., novolac and/or resole, and additives other than water. Typically, the mixing occurs in the presence of a coupling agent such as gamma/amino propyl triethoxy silane. The coupling agent may be added to the mixer 9 before, or premixed with the binder stream 12. Typically, 0 to 50% of the total binder stream 12 is water. Typically, mixing time ranges from 1 to 5 minutes at a pan rotation speed of 50 to 80 rpm and a chopper speed of 1400 to 1600 rpm. The granulation (nucleation time) ranges from about 2 to about 10 minutes with a vessel speed of 25 to 45 rpm and a chopper speed of 1400 to 1600 rpm. The smoothing is also known as "chopping." The temperature of the granulator 10 during the above steps ranges from 10 to 40° C.

The granulated material stream 16 then passes to a curing apparatus 50. Typically, curing apparatus 50 is a drying oven operating at a residence time for the granulated material of about 0.5 to about 2 hours, at a temperature of about 90° to about 200° C., preferably about 150° to about 190° C. This produces a cured granulated product stream 52 which feeds a screening apparatus 80 to recover a proppant product stream 82 of predetermined product size. A typical screening apparatus 80 is a sieve such as a vibrating screen. A typical desired proppant particle has a $d_{50}$ from 0.4 to 0.8 mm, or a particle diameter range is 20 to 40 mesh (0.425 to 0.85 mm) or 30to 40rpm.

Figure 2:
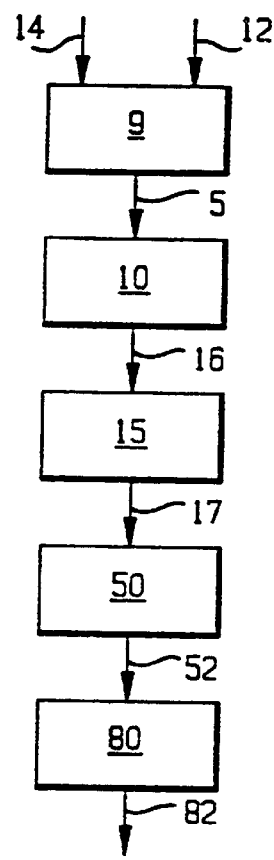
FIG. 2 shows a process flow diagram of a second embodiment of a process for making particles of the present invention.

FIG. 2 shows a second embodiment of a process for making proppants or filtration media of the present invention. This embodiment resembles the process of FIG. 1 except that the granulated material stream 16 is fed dried but uncured to a refining apparatus 15 to mechanically increase the sphericity of the granulated material to a sphericity of at least about 0.8, preferably at least about 0.85, and more preferably at least about 0.9, and produce a stream 17 of such mechanically treated material.

This step performs a mechanical refining of the surface to make it approximately a spherical shape. For example, this is typically done either by putting the granules of FIG. 2, dried at 40° C., but not cured, in a granulating pan with a high tilt angle and high rotational speed, or by processing them in a SPHERONIZER device, manufactured by Calvera Process Solutions Limited, Dorset, England, at 400–1000 rpm for about 3 to about 30 minutes. The smoothing occurred by a removal process (grinding process) in which the particles in a profiled rotating pan are thrown out against a cylindrical wall and then rolled back onto the plate of the pan.

Alternatively, the particles may be smoothed and compressed by rolling before curing.

Figure 3:
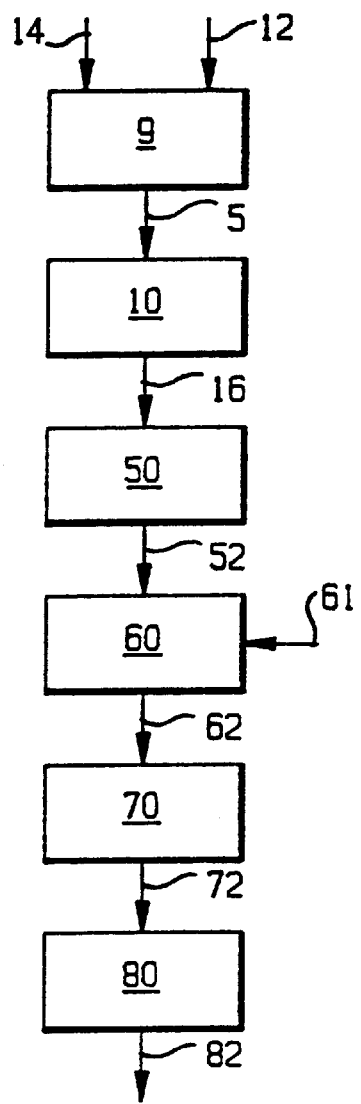
FIG. 3 shows a process flow diagram of a third embodiment of a process for making particles of the present invention.

FIG. 3 shows a process flow diagram of a third embodiment of a process for making proppants or filtration media of the present invention.

The process is similar to that of FIG. 2 except that the cured granulated product stream 52 is fed to a coating apparatus 60 which coats/impregnates the cured granulated material of stream 52 with additional resin from a second binder stream 61. This produces proppant particles having a core of resin and filler, wherein the core is coated with resin. In particular, the cured (or partially cured) stream 52 of core particles discharges from the curing apparatus 50 and then feeds the coating apparatus 60. The coating apparatus 60 is typically a profiled rotating drum or some form of batch mixer. This rotating drum apparatus may have a rotation speed of 16–20 rotations/min. Typically, the second resin stream 61 is preheated to 50–60° C. and sprayed into the rotating drum apparatus (containing the formed particles) through a nozzle with air atomizing. This rotating drum apparatus operates as a batch process with a process time of about to 20 minutes.

If an Eirich mixer R02 is employed as the coating apparatus, it operates at a vessel rotation speed of 20–40, preferably 30–35, rotations/min and a chopper speed of 700–1100, preferably 800–1000, rotations per minute with a process time of 2–10 minutes, preferably 2–5 minutes.

The second binder stream 61 typically contains a solution of resin, water, and conventional resin additives. The dry weight ratio of the binder stream 12 to the second binder stream 61 is about 70 to 60:30 to 40. Second stream 61 and stream 52 are preferably fed to the coating apparatus 60 to provide a weight ratio of second stream resin (on a water free basis) to uncoated proppant particles of about 1 to 10 parts resin:95 parts uncoated proppant particles. The resin in the first binder stream 12 may be the same or different from the resin in the second binder stream 61. Alternatively, when a proppant having curable resin in its core is desired, the oven 50 may be operated to merely dry the coated proppant.

Preferably, stream 16 is fed to a refining apparatus (not shown) such as refining apparatus 15 of FIG. 2 prior to curing/drying in apparatus 50.

The coated proppant discharges from the coating apparatus 60 as the coated proppant stream 62 and then feeds the curing apparatus 70.

The curing apparatus 70 is typically a chamber dryer which heats the proppant from a temperature of about 20° to about 180° C. on flat plates (or it may be a rotary drier). The curing apparatus 70 maintains the coated proppant at a suitable curing temperature, for example about 120° to about 180° C. for a suitable curing time, for example about 0.5 to about 2 or more hours. If a proppant having a curable coating is desired, then curing apparatus 70 is operated to dry, or partially cure, the coating.

The cured proppant is discharged from the curing apparatus 70 as a cured proppant particle stream 72 which is sieved in a sieving apparatus 80 to recover a proppant product stream 82 of a predetermined particle size range. A typical predetermined particle size range is about 20 to about 40 mesh. A typical sieving apparatus 80 is a vibration sieve. Particles having a size outside the predetermined particle size are discharged as stream 84.

Figure 4:
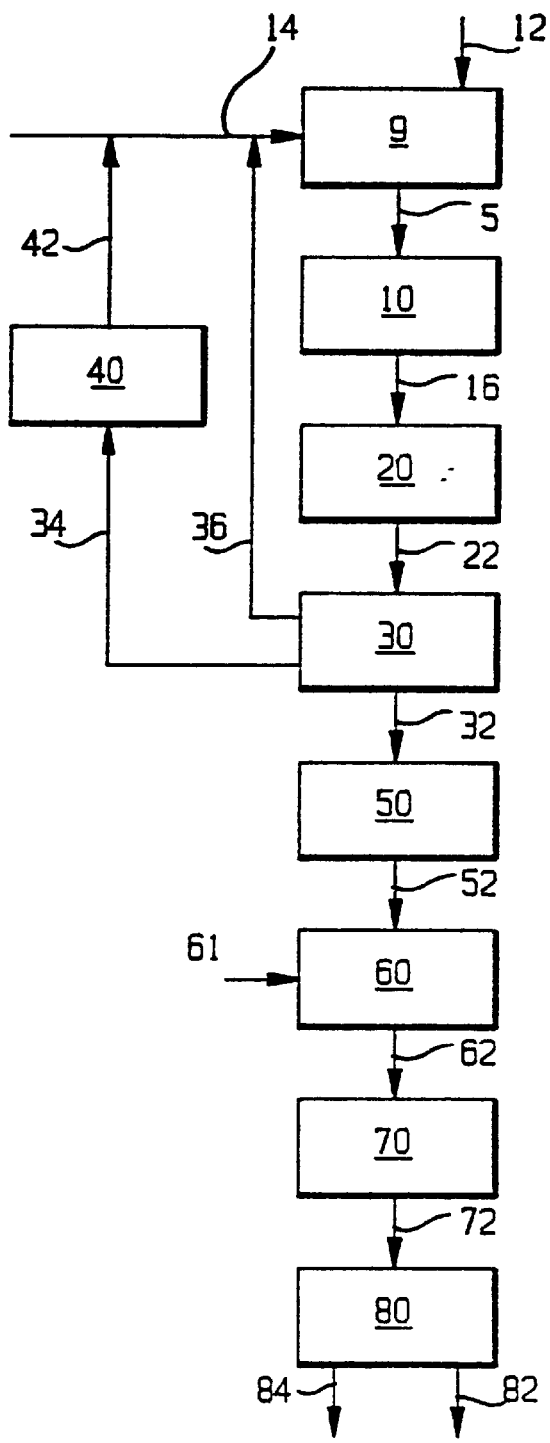
FIG. 4 shows a process flow diagram of the process of FIG. 3 modified to include recycle of particles.

FIG. 4 generally shows the process of FIG. 3 with a recycle step. The granulated material is discharged from the granulator 10 as stream 16 and passes to a dryer 20. Typically, dryer 20 is a chamber dryer operating at a temperature of about 30° to 40° C. for a time sufficient to remove water to be dry enough that the particles do not stick together. Typical drying times range from about 0.5 to 2 hours. As with the process of FIG. 3, a refining step may further be employed on stream 16.

Dried granulated material stream 22 is then fed to a sieve 30. A typical sieve 30 is a vibrating screen. Sieved particles of predetermined mesh size range are discharged as a sieved stream 32. Particles of a size larger than the predetermined mesh size range are discharged as a first recycle stream 34 which is sent to a crusher 40 and then is recycled to the granulator 10. A typical predetermined mesh size for these core particles is about 8 to about 20 mesh. Another typical desired size range is 20 to 40 mesh. Particles of a size smaller than the predetermined size are recycled to the granulator 10 as a second recycle stream 36.

Sieved stream 32 passes to the curing apparatus 50. Curing apparatus 50 may be a chamber dryer which cures the material on flat plates and operates at a temperature of 120° to 200° C., preferably 15° to 190° C., for a time to produce a desired degree of curing. Typical curing time ranges from 0.5 to 2 hours. However, this curing step may be omitted, and the particles merely dried, if the particles of sieved stream 32 have the sufficient degree of (or lack of) curing.

The cured (or partially cured) stream 52 of proppant particles discharges from the curing apparatus 50 and then feeds the coating apparatus 60.

Typical starting material for operation of the process of FIG. 4 may be summarized as shown by TABLE 1.

TABLE 1

| | Starting material | | |
|---|---|---|---|
| filler: | quartz sand $d_p = 8$ μm; | | $\rho = 2.65$ g/cm$^3$ |
| binder: | plastiphan P2102* (72% solid resol in P2102) | | $\rho = 1.23$ g/cm$^3$ |

| | Composition | | | | | | | |
|---|---|---|---|---|---|---|---|---|
| | weight percent | | | | volume percent | | | |
| | P2102 | filler | resol | filler | P2102 | filler | resol | filler |
| pre-granulate Eirich-mixer (= QP65) | 16 | 84 | 12.1 | 87.9 | 29.1 | 70.9 | | |
| product after coating (= QP65c) | 20 | 80 | 15.3 | 84.7 | 35 | 65 | | |

*Available from Borden Chemical, Inc.

Typical operation of the process of FIG. 4 is summarized as shown by TABLE 2.

TABLE 2

| | |
|---|---|
| mixing/granulation | |
| equipment: | Eirich-mixer R02 |
| composition: | 84 wt. % filler, 16 wt % P2102 |
| processing: | - batch process |
| | - mixing time 2 min |
| | (vessel 64 min$^{-1}$, chopper 1500 min$^{-1}$) |
| | - granulation time 3–5 min |
| | (vessel 32 min$^{-1}$, chopper 1500 min$^{-1}$) |
| | - moisture correction (depending on particle size of filler by adding of water or filler; Rule: higher moisture = greater grains |
| | - visual process controlling on samples for grain size/granulation time |
| drying equipment: | chamber dryer/rotating kiln |
| processing: | 60° C./1 hour |
| sieving equipment: | vibration sieve |
| processing: | 18/30 mesh |
| curing equipment: | chamber dryer |
| processing: | heating 20–160° C./2 h |
| | 180° C./1–2 h |
| | material on flat plates |
| coating equipment: | rotating plate or Eirich mixer |
| composition: | 5 wt. % plastiphen P2102, 95 weight percent granulate batch |
| processing: | process |
| | a) rotating plate TR10 |
| | rotation 16–20 min$^{-1}$ |
| | preheating P2102 50...60° C. |
| | nozzle with air atomizing |
| | process time 10 min |
| | b) Eirich mixer R02 |
| | vessel 32 min$^{-1}$ |
| | chopper 900 min$^{-1}$ |
| | preheating P2102 50–60° C. |
| | liquid dosage in the batch |
| | process time 3 min |
| curing equipment: | chamber dryer/rotating kiln |
| processing: | 180° C./1–2 hours |
| | heating 20–180° C./2 hours |
| | material on flat plates |
| sieving equipment: | vibration sieve |
| processing: | 18/30 mesh |

Proppants may also be made by modifying the above processes by extruding pellets in an extruder and then mechanically making the pellets spherical (rather than granulating spherical pellets in an Eirich mixer.

H. Proppant Particle

Figure 5:
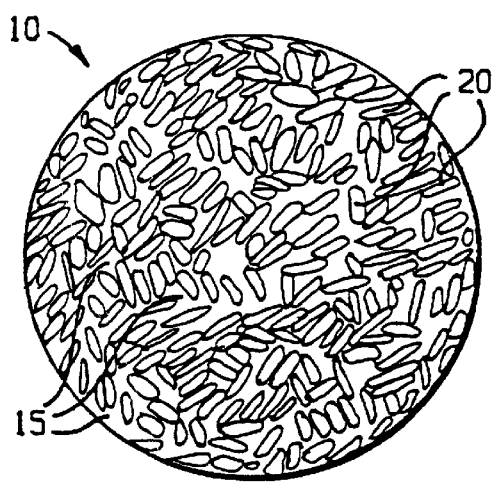
FIG. 5 shows a first embodiment of a particle of proppant or filtration media of the present invention.

FIG. 5 shows a proppant particle 10 comprising filler particles 20, and a resin 15.

Figure 6:
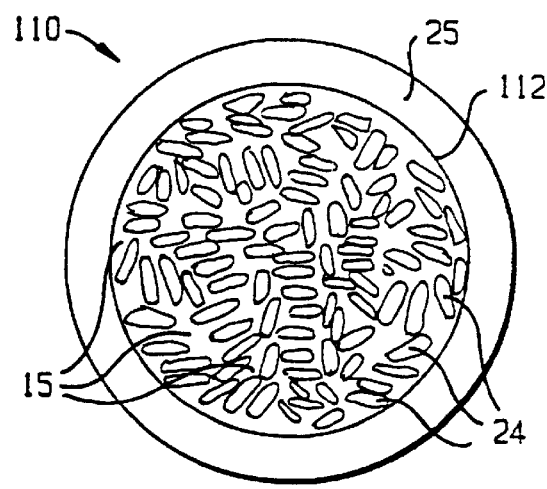
FIG. 6 shows a second embodiment of a particle of proppant or filtration media of the present invention.

FIG. 6 shows a coated proppant particle 110 having a core 112, of resin 15 and filler particles 24, coated by a second resin coating 25.

I. Composite Particle Parameters

The following parameters are useful when characterizing composite proppant particles and composite filtration media particles of the present invention.

The composite particles of the present invention generally have a density lighter than conventional sand. Preferably the proppant particles have a bulk density of 70–95 lbs/ft$^3$. They have a sphericity of greater than 0.7, preferably greater than 0.85, and more preferably greater than 0.9. The volume percent filler particles in the composite proppants is 60 to 85%, preferably about 60 to about 75 volume percent, more preferably about 65 to about 75 volume percent. The weight percent filler particles in the composite particles is about 70 to about 90%. The weight percent filler particles in the core of a coated proppant particle typically is about 80 to about 90%. The composite particle $d_{50}$ ranges from about 0.4 to about 0.8 mm. For coated proppant the dry weight ratio of the first portion of binder to the second portion of binder is 70 to 60:30 to 40. The composite particles are within a size range from about 4 to about 100 mesh based on U.S. Standard Sieve Series, preferably a size range of a 20/40 material based on API Method RP 56 Section 4 (0.425 to 0.85 mm).

Crush material <4% of precured proppants at 4000 psi closure stress is defined as that measured according to the following procedure. American Petroleum Institute Method RP 56 procedure Section 8.

Dust levels are measured as turbidity by API Method RP 56 Section 7.

Sphericity is determined by API Method 56 Section 5.

Chemical inertness should be comparable to Jordan silica sand (20/40 mesh) with regard to resistance to hydrocarbons and sodium hydroxide solution at pH12. Acid resistance is determined by API Method RP 56 Section 6. The alkali resistance is determined as the resistance to sodium hydroxide solution at pH 12 and 200° F. for 48 hours. The pH to be kept at 12 by addition of caustic as required. The properties and appearance of the proppant should not change when exposed to aliphatic or aromatic hydrocarbons for 96 hours at 200° F. The hydrocarbon should not change color during the test.

J. Use of Composite Particles

The composite particles, as described in this invention have special and unique properties such as controlled plasticity and elasticity behavior. Because of these unique properties, the composite particles can be applied as the sole proppant in a 100% proppant pack (in the hydraulic fracture) or as a part replacement of existing commercial available ceramic and/or sand-based proppants, resin-coated and/or uncoated, or as blends between those. The composite particles can also be employed as the sole media in a 100% filtration pack or blended with other filtration media.

When the method of the present invention employs a proppant having a precured resin composition, the proppant is put into the subterranean formation without a need for additional curing within the formation.

When the method employs a proppant having a curable resin composition, the method may further comprise curing the curable resin composition by exposing the resin composition to sufficient heat and pressure in the subterranean formation to cause crosslinking of the resins and consolidation of the proppant. In some cases an activator can be used to facilitate consolidation of curable proppant. In another embodiment employing a curable resin composition on the proppant, the method further comprises low temperature acid catalyzed curing at temperatures as low as 70° F. An example of low temperature acid catalyzed curing is disclosed by U.S. Pat. No. 4,785,884 incorporated herein by reference in its entirety.

Also, resin-containing particulate material may be used by filling a cylindrical structure with the resin-containing particulate material, i.e., proppant, and inserted into the wellbore. Once in place, the improved properties of this invention are beneficial because the proppant will cure and act as a filter or screen to eliminate the backwards flow of sand, other proppants, or subterranean formation particles. This is a significant advantage to eliminate the back flow of particulates into above ground equipment.

The present composite particles are especially advantageous due to their roundness. This enhances conductivity whether the particles are used alone as a proppant, or together with other proppants, in multi-layer packs. Multi-layer packs by definition are not the partial monolayers used in U.S. Pat. No. 3,659,651. In partial monolayers there are particles in the well that touch the fracture walls, but do not touch each other. In contrast, in multi-layer packs the proppant fills the fractures and production is through the porosity of the proppant.

EXAMPLES 1–12

The invention is explained in more detail in the following, with twelve compositions as example embodiments, and with modifications of the above-described processes of FIGS. 1–3. As stated above, the accompanying drawings show:

FIG. 1: A first embodiment of a process for making composite particles of the present invention.

FIG. 2: A second embodiment of a process for making composite particles of the present invention.

FIG. 3: A third embodiment of a process for making composite particles of the present invention.

Twelve compositions were made to have the compositions listed in TABLE 3. The volume proportions refer to the finally cured "composite proppant" while the weights refer to the composition before granulation. The quartz sand ("Q" indicates quartz) have a $SiO_2$ content>98.3%, fineness of grind, $d_{50}$=6 $\mu$m and density of 2.63 g/cm$^3$. The aluminum oxide (indicated by "A") has $\geq$99% $Al_2O_3$, fineness of grind, $d_{50}$=7.5 $\mu$m, and density of 3.96 g/cm$^3$. A fluid phenol-formaldehyde resol resin (symbolized by "P") and a viscous resol resin (indicated by "F") were used as the synthetic resins, with water as the solvent. The phenol-formaldehyde resols, used in this process have a ratio between phenol:formaldehyde of 1:1.1 to 1:1.9. Typical ratios are around 1:1.2 to 1.5. The fineness of the quartz sand and other fillers also can be used in the range $d_{50}$=3–45 $\mu$m.

TABLE 3

| Example No. | Mineral | | Synthetic resin | | Solvent |
|---|---|---|---|---|---|
| 1 | 860 g | 65% Q v/v | 215 g | 35% P v/v | 20 g |
| 2 | 927 g | 70% Q v/v | 185 g | 30% P v/v | 18 g |

TABLE 3-continued

| Example No. | Mineral | | Synthetic resin | | Solvent |
|---|---|---|---|---|---|
| 3 | 993 g | 75% Q v/v | 155 g | 25% P v/v | 15 g |
| 4 | 1267 g | 65% A v/v | 215 g | 35% P v/v | 20 g |
| 5 | 1365 g | 70% A v/v | 185 g | 30% P v/v | 18 g |
| 6 | 1492 g | 75% A v/v | 155 g | 25% P v/v | 15 g |

Use of resol resin F at the same proportions of Examples 1–6 gives the compositions of Examples 7–12, respectively.

These compositions were first compressed at 53 Mpa into test bars with dimensions 5×5×56 mm and put in a dry box at 160 to 240° C. and cured for ten minutes. In view of the ability to granulate, the compositions with 65% by volume mineral, which generally had the highest bending resistance, were preferred for processing into proppant granulations with grain sizes from about 0.4 mm to about 0.8 mm, (20/40 mesh size) according to the process of FIG. 1.

EXAMPLES 13–18

Particles dried at 80° C., in accordance with the process of FIG. 2, but not cured, were subjected to mechanical refining of the surface to smooth it and make it approximate a spherical shape. That was done either by putting the granules in a granulating pan with a high tilt angle and high rotational speed, or by processing them in a SPHERONIZER device at 400–1000 rpm for 3–30 minutes. The smoothing occurred by a removal process (grinding process) in which the particles in a profiled rotating pan were thrown out against a cylindrical wall and then rolled back onto the plate.

According to the process of FIG. 3, the finished cured particles were formed using about 70% by weight of their final synthetic resin content and then were surface-coated with the remaining 30% by weight of the synthetic resin on a rotating disk.

The individual particles listed in TABLE 4, serially numbered, were produced and examined to determine their principal parameters, such as density, sphericity and Brinell hardness:

Example No. 13, composition of Example 1, made according to the process of FIG. 1.

Example No. 14, composition of Example 1, made according to the process of FIG. 2, with later smoothing in a SPHERONIZER device.

Example No. 15, composition of Example 1, made according to the process of FIG. 3, with second curing in a dry box.

Example No. 16, composition of Example 1, made according to the process of FIG. 3, with second curing in a rotary kiln.

Example No. 17, composition of Example 7, made according to the process of FIG. 1.

Example No. 18, composition of Example 10, made according to the process of FIG. 1.

TABLE 4

| Example No. | Bulk density (g/cm$^3$) | Grain density (g/cm$^3$) | Sphericity | Brinell hardness (Mpa) |
|---|---|---|---|---|
| 13 | 1.12 | 1.87 | 0.82 | 123.7 |
| 14 | 1.19 | 1.98 | 0.84 | 102.3 |
| 15 | 1.29 | 2.15 | 0.92 | 151.0 |
| 16 | 1.14 | 1.90 | 0.92 | 129.0 |
| 17 | 1.12 | 1.87 | >0.8 | <100.0 |
| 18 | 1.44 | 2.40 | 0.85 | 105.2 |

Of these Examples, Example 15 was found to be particularly promising for the intended use, and its characteristics were studied in more detail. The following data of TABLE 5 were found for the effect of the curing temperature, with a curing time of 30 minutes, on the bending strength of test pieces of Example No. 15. They also allow conclusions about other strength characteristics:

TABLE 5

| Curing Temperature | Flexural Strength |
|---|---|
| 160° C. | 89 Mpa |
| 180° C. | 72 Mpa |
| 200° C. | 81 Mpa |
| 220° C. | 80 Mpa |
| 240° C. | 72 Mpa |
| 260° C. | 26 Mpa |
| 280° C. | 22 Mpa |
| 300° C. | 22 Mpa |

A crush test according to API RP 56/60, modified as follows, was also done on a sample of Example No. 15 cured for 30 minutes at 180° C.:

a) Fill a crush cell 31 mm in diameter with granulation to a height of 10 mm.
b) Increase the compressive load in steps to about 100 Mpa (14,500 psi), recording the deformation of the granulate pack at two test temperatures, 20° C. and 125° C.

The results are shown in TABLE 6:

TABLE 6

| Pressure (Mpa) | Pressure (psi) | Deformation (mm) @ 20° C. | Deformation (mm) @ 125° C. |
|---|---|---|---|
| 0.29 | 42 | | 0.06 |
| 0.54 | 78 | 0.08 | |
| 0.60 | 87 | | 0.10 |
| 1.16 | 168 | | 0.16 |
| 1.23 | 178 | 0.13 | |
| 2.90 | 420 | | 0.27 |
| 3.10 | 449 | 0.23 | |
| 5.92 | 858 | | 0.40 |
| 6.29 | 912 | 0.34 | |
| 12.00 | 1739 | | 0.65 |
| 12.60 | 1826 | 0.50 | |
| 24.25 | 3514 | | 0.95 |
| 25.19 | 3651 | 0.77 | |
| 36.57 | 5300 | | 1.36 |
| 37.69 | 5462 | 1.03 | |
| 49.10 | 7116 | | 1.80 |
| 50.15 | 7268 | 1.31 | |
| 61.48 | 8910 | | 2.21 |
| 61.98 | 8983 | 1.60 | |
| 74.33 | 10772 | | 2.55 |
| 75.77 | 10981 | 1.90 | |
| 87.27 | 12648 | | 2.83 |

TABLE 6-continued

| Pressure (Mpa) | Pressure (psi) | Deformation (mm) @ 20° C. | Deformation (mm) @ 125° C. |
|---|---|---|---|
| 88.58 | 12838 | 2.18 | |
| 98.12 | 14220 | | 3.01 |
| 99.30 | 14391 | 2.37 | |

The following values of TABLES 7 and 8 were also determined for the same sample:

TABLE 7

Breaking strength in the composite proppant stackpack

| | |
|---|---|
| 52 Mpa | 0.99% by weight breakage |
| 69 Mpa | 2.39% by weight breakage |
| 86 Mpa | 4.18% by weight breakage |
| 103 Mpa | 7.10% by weight breakage |

TABLE 8

| Particle size distribution | | |
|---|---|---|
| Screen mesh width in mm | Retained, % by weight | Cumulative, % by weight |
| 1.0 | 0.0 | 100.00 |
| 0.8 | 1.32 | 98.68 |
| 0.71 | 4.62 | 94.06 |
| 0.63 | 15.47 | 78.59 |
| 0.50 | 48.15 | 30.44 |
| 0.40 | 27.06 | 3.38 |
| 0.25 | 3.88 | 0.00 |
| <0.25 | 0.0 | — |

The acid solubility of this Example No. 15, by API RP 56/60, was 4.4% by weight.

EXAMPLES 19–21

TABLES 9 and 10 show recommended parameter values and actual parameters of Examples 19–21 made by a process of FIG. 3.

TABLE 9

| Property Measured | Recommended Limits | Example 19 | Example 20 | | Example 21 |
|---|---|---|---|---|---|
| API Mesh Size Nominal | 20/40 | 20/40 | 20/40 | | 20/40 |
| Resin Content, loss on ignition (LOI), weight % | — | 14.6 | 16.7 | | 15.5 |
| Curable Resin Content, % of LOI | — | 0.2 | 0.4 | | — |
| Particle Size Distribution | | | weight % retained | | |
| | | | Example 20A "as is" | Example 20B "resieved" | |
| U.S. Standard Sieve No. (mm) | | | | | |
| 16 (1.19) | ≦0.1 | 0.0 | 0.0 | 0.0 | — |
| 18 (1.00) | — | — | — | — | 0.0 |
| 20 (0.84) | — | 0.0 | 0.0 | 0.0 | — |
| -23 (0.80) | — | — | — | — | 1.3 |
| 25 (0.71) | — | 13.5 | 1.3 | 1.5 | 4.6 |
| -28 (0.63) | — | — | — | — | 15.5 |
| 30 (0.589) | — | 41.0 | 16.7 | 18.7 | — |
| 35 (0.50) | — | 26.0 | 29.4 | 33.0 | 48.2 |
| 40 (0.42) | — | 14.6 | 41.8 | 46.8 | — |
| -42 (0.40) | — | — | — | — | 27.0 |
| 50 (0.297) | — | 4.8 | 10.7 | 0.0 | — |
| 60 (0.25) | — | — | — | — | 3.4 |
| pan (<0.297 or <0.25) | <1.0 | 0.1 | 0.1 | 0.0 | 0.0 |
| TOTAL | 100.0 ± 0.5 | 100.0 | 100.0 | 100.0 | 100.0 |
| in-size, -20 + 40 mesh, (0.84–0.42 mm) | ≧90.0 | 95.1 | 89.2 | 100.0 | 95.3 |
| mean particle diameter, inch (mm) | — | 0.023 (0.59) | 0.020 (0.50) | 0.021 (0.52) | — |
| Turbidity, NTU (FTU) | ≦500 | 60 | 80 | — | — |

TABLE 10

| Property Measured | Recommended Limits | Example 19 | Example 20 | Example 21 |
|---|---|---|---|---|
| Crush Resistance @ Closure Stress, psi (Mpa) | | weight % fines generated | | |
| 15,000 (103) | ≦10 | 5.4 | 12.8 | 7.1 |
| 12,500 (86) | | 3.4 | 8.5 | 4.2 |
| 10,000 (69) | | 1.9 | 5.5 | 2.4 |
| 7,500 (52) | | 0.9 | 3.6 | 1.0 |

TABLE 10-continued

| | | | | |
|---|---|---|---|---|
| 6,000 (41) | | — | 2.6 | — |
| 5,000 (36) | | — | 2.2 | — |
| 4,000 (28) | ≦4 | — | 2.0 | — |
| 3,000 (21) | | — | 1.8 | — |
| 2,000 (14) | | — | 1.6 | — |
| Krumbein Shape Factors | | | | |
| roundness | ≧0.9 | 0.8 | 0.7 | 0.9 |
| sphericity | ≧0.9 | 0.8 | 0.8 | 0.8 |
| Acid Solubility, weight % | ≦1.0 | 4.4 | 0.27 | <1 |
| Clusters, weight % | ≦1.0 | 1.1 | 1.5 | 5 |
| Density, Bulk, g/cm³ (lb$_m$/ft³) | ≦1.6 (100) | 1.29 (80.5) | 1.21 (75.5) | 1.22 (76.2) |
| Density, Absolute (particle), g/cm³ (lb$_m$/gal) | ≦2.65 (22.1) | 2.22 (18.5) | 2.13 (17.8) | 2.10 (17.5) |
| | | weight % fines generated | | |
| Crush Resistance** @ Closure Stress 10,000 psi (69 Mpa) | | 5.5 | — | 6.2 |

**Aromatic Solvent Effects: 20° F. (93° C.), 96 hr. aromatic solvent ND.

TABLE 11 shows conductivity and permeability data. TABLE 12 lists test procedures for properties listed for proppant of various examples.

TABLE 11

Short-term Conductivity & Permeability of Example 20 Proppants

| 200° F. (93° C.) deionized water between stainless steel shims Closure Stress, psi (Mpa) | Example 20A sample "as is" | Example 20B excluding >40 particles |
|---|---|---|
| | Conductivity, md-ft (Permeability, darcy) | |
| 2,000 (14) | 3251 (143) | 4209 (181) |
| 4,000 (28) | 1080 (53) | 960 (47) |
| 6,000 (41) | 216 (11) | 253 (13) |
| 8,000 (56) | 80 (4) | 88 (5) |

TABLE 12

| Property Measured | Procedure |
|---|---|
| Acid Solubility | API RP-56, section 6 |
| Density, Absolute (Particle) | API RP-60, section 8 |
| Density, Bulk | API RP-60, section 8 |
| Clusters (agglomeration) | API RP-56, section 5.5 |
| Crush Resistance | API RP-56/60, section 8/7 |
| Particle Size Distribution | API RP-56/60, section 4, |
| Short-term Conductivity | API RP-61 |
| Turbidity | API RP-56, section 7, Method 1, modified |

While specific embodiments of the composition and method aspects of the invention have been shown and described, it should be apparent that many modifications can be made thereto without departing from the spirit and scope of the invention. Accordingly, the invention is not limited by the foregoing description, but is only limited by the scope of the claims appended thereto.

What is claimed is:

1. A composite particle comprising:
   a substantially homogeneous formed particle comprising:
   a first portion of a binder and filler particles dispersed throughout said first portion of binder, wherein said first portion is at least partly cured;
   particle size of said filler particles ranges from about 0.5 to about 60 μm, said composite particle having a sphericity of at least about 0.7; and
   an optional second portion of a binder coating the formed particle;
   the composite particle being 60–85 volume percent said filler particles.

2. The composite particle of claim 1, wherein the sphericity is at least about 0.85.

3. The composite particle of claim 1, wherein the sphericity is at least about 0.9.

4. The composite particle of claim 1, further comprising a member selected from the group consisting of milled glass fibers, milled ceramic fibers, milled carbon fibers, natural fibers and synthetic fibers having a softening point of at least about 200° F.

5. The composite particle of claim 1, wherein the composite particle bulk density ranges from about 70 to about 95 lbs/ft³.

6. The composite particle of claim 1, wherein the binder consists essentially of at least one member of the group consisting of inorganic binder, epoxy resin, novolac resin and resol resin and further consists essentially of optional cross-linking agents and conventional additives.

7. The composite particle of claim 1, wherein the binder comprises a high ortho resin, hexamethylenetetramine, a silane adhesion promoter, a silicone lubricant, a wetting agent and a surfactant.

8. The composite particle according to claim 1, wherein the composite particles have diameters between 20 and 40 mesh and comprise a coating of a layer of synthetic resin.

9. The composite particle according to claim 1, wherein the composite particles have diameters between 30 and 40 mesh and comprise a coating of a layer of synthetic resin.

10. The composite particle according to claim 1, wherein the composite particles have diameters between 8 and 20 mesh and comprise a coating of a layer of synthetic resin.

11. The composite particle of claim 1, wherein the filler particles are a finely divided mineral.

12. The composite particle of claim 1, wherein the filler particles are present in a proportion from about 60 to about 75% by volume of composite particle.

13. The composite particle of claim 1, wherein the proportion of filler particles substance is from about 65 to about 75% by volume of composite particle.

14. The composite particle of claim 1, wherein the binder comprises a member of the group consisting of a phenolic/furan resin, a furan resin, and mixtures thereof.

15. The composite particle of claim 1, wherein the binder comprises a bisphenolic-aldehyde novolac polymer.

16. The composite particle according to claim 1, wherein the first portion of binder comprises resol resin.

17. The composite particle according to claim 1, wherein the first portion of binder comprises resol resin modified with gamma-aminopropyltriethoxy-silane acting as a coupling agent between the filler and the synthetic resin.

18. The composite particle according to claim 1, wherein the first portion of binder comprises resol resin with a phenol:formaldehyde ratio of 1:1.1 to 1:1.95.

19. The composite particle according to claim 1, wherein the first portion of binder comprises resol resin with a phenol:formaldehyde ratio of 1:1.2 to 1:1.6.

20. The composite particle of claim 1, wherein the first portion of binder comprises cured binder.

21. The composite particle of claim 1, wherein the first portion of binder comprises a cured binder, and the second portion of binder comprises a curable binder.

22. The composite particle of claim 1, wherein the filler particles comprise at least one mineral selected from the group consisting of silica (quartz sand), alumina, mica, meta-silicate, calcium silicate, calcine, kaoline, talc, zirconia, boron and glass.

23. The composite particle of claim 1, wherein the filler particles are at least one mineral selected from the group consisting of quartz sand and aluminum oxide.

24. The composite particle of claim 1, wherein the filler particles comprise fly ash.

25. The composite particle of claim 1, wherein the filler particles are a mineral having a grain size, $d_{50}$, of 4 to 6 $\mu$m.

26. The composite particle of claim 1, wherein the filler particles are a mineral having a grain size, $d_{50}$, of 4 to 10 $\mu$m.

27. The composite particle of claim 1, wherein the filler particles are of mineral substance and the proportion of mineral substance is about 70 to 90% by weight of composite particle.

28. A method for producing a composite particle according to claim 1, comprising mixing the filler particles, the first portion of binder, at least one member of the group consisting of water and an organic solvent, and optional additives to form a mixture and to adjust agglomeration behavior of the filler particles; subjecting the mixture to agalomerative granulation; and curing the first portion of binder.

29. The method according to claim 28, wherein the agglomerative granulation of the mixture is performed by contacting the mixture with a rotating disc.

30. The method according to claim 28, wherein the agglomerative granulation of the mixture is performed by spraying the mixture.

31. The method according to claim 28, wherein the filler particles, the first portion of binder, at least one member of the group consisting of water, and an organic solvent, and optional additives are mixed to form the mixture and to adjust the plasticity of the mixture; the mixture is granulated in the plastic state to form the formed particles; and the first portion of binder in the formed particles is cured.

32. The method according to claim 31, wherein after the first portion of binder has cured, the formed particles are coated with the second portion of binder and cured again.

33. The method according to claim 31, wherein the formed particles are smoothed and compressed by rolling before crosslinking of the binder.

34. The method according to claim 31, wherein after granulation the solvent is dried, after the drying but before curing the first portion of binder, the formed particles are coated with resin.

35. The method according to claim 28, wherein the agglomerative granulating is done by extrusion as strands, cutting the strands into fragments, and shaping the fragments under the influence of centrifugal force into spherical granules.

36. A method of treating a hydraulically induced fracture in a subterranean formation surrounding a wellbore comprising introducing composite particles of claim 1 into the fracture.

37. The method according to claim 36, wherein a multilayer pack comprising the composite particles is formed in the formation.

38. The method according to claim 36, wherein the first portion of binder consists essentially of a resole resin.

39. The method of claim 36, further comprising introducing particles selected from at least one member of the group consisting of sand, sintered ceramic particles and glass beads into the fracture.

40. The method of claim 36, wherein the sand particles comprise resin-coated sand particles.

41. The method of claim 36, wherein the sphericity of the composite particles is at least about 0.85.

42. The method of claim 36, wherein the composite particles have diameters between 20 and 40 mesh and comprise a coating of a layer of synthetic resin.

43. The method of claim 36, wherein the composite particles have diameters between 8 and 20 mesh and comprise a coating of a layer of synthetic resin.

44. The method of claim 36, wherein the filler particles are a finely divided mineral.

45. The method of claim 36, wherein the proportion of filler particles substance is from about 65 to about 75% by volume of composite particle.

46. The method of claim 36, wherein the filler particles comprise fly ash.

47. The method of claim 36, wherein the filler particles are a mineral having a grain size, $d_{50}$ of 4 to 10 $\mu$m.

48. A method for water filtration comprising passing water through a filtration pack comprising the composite particles of claim 1.

49. The method of claim 36, wherein the composit particles are fed to the subterranean formation as a sole proppant to be 100% of a proppant pack in the subterranean formation.

50. The composite of claim 1, wherein the binder comprises a member of the group consisting of polyethylene, acrylonitrile-butadiene styrene, polystyrene, polyvinyl chloride, polypropylene, styrene acrylonitrile, and nylon.

51. The composite particle of claim 1, wherein the binder comprises a member of the group consisting of fluoroplastics and polysulfides.

52. The composite particle of claim 1, wherein the binder comprises phenylene oxide.

53. The composite particle of claim 1, wherein the binder comprises latex.

54. A method of treating a wellbore of a subterranean formation comprising filling a cylindrical structure with composite particles of claim 1 to form a filter, and inserting the cylindrical structure with the composite particles into the wellbore.

\* \* \* \* \*